(12) United States Patent
Schmid et al.

(10) Patent No.: US 12,151,639 B2
(45) Date of Patent: *Nov. 26, 2024

(54) AIRBAG

(71) Applicants: ZF AUTOMOTIVE GERMANY GMBH, Alfdorf (DE); AUDI AG, Ingolstadt (DE)

(72) Inventors: Simon Schmid, Heuchlingen (DE); Sven Tamme, Alfdorf (DE); Benjamin Weimer, Spraitbach (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,420

(22) Filed: May 12, 2023

(65) Prior Publication Data

US 2023/0278518 A1  Sep. 7, 2023

Related U.S. Application Data

(62) Division of application No. 17/414,944, filed as application No. PCT/EP2019/086040 on Dec. 18, 2019, now Pat. No. 11,685,333.

(30) Foreign Application Priority Data

Dec. 20, 2018 (DE) ............ 10 2018 133 051.0

(51) Int. Cl.
*B60R 21/2338* (2011.01)
*B60R 21/205* (2011.01)
*B60R 21/2342* (2011.01)
*B60R 21/01* (2006.01)

(52) U.S. Cl.
CPC ........ *B60R 21/2338* (2013.01); *B60R 21/205* (2013.01); *B60R 21/2342* (2013.01); *B60R 2021/01225* (2013.01); *B60R 2021/01238* (2013.01); *B60R 2021/23384* (2013.01)

(58) Field of Classification Search
CPC .......... B60R 2021/23384; B60R 2021/23382; B60R 2021/23388; B60R 2021/01238; B60R 2021/01225; B60R 21/2338; B60R 21/2342; B60R 21/205; B60R 21/231
USPC ................... 280/743.2, 732, 743.1
See application file for complete search history.

(56) References Cited

U.S. PATENT DOCUMENTS

| | | |
|---|---|---|
| 8,419,058 B2 | 4/2013 | Fischer et al. |
| 8,840,140 B2 | 9/2014 | Mendez |
| 9,676,355 B2 | 6/2017 | Kruse |

(Continued)

FOREIGN PATENT DOCUMENTS

| | | |
|---|---|---|
| DE | 102014000185 A1 | 7/2015 |
| GB | 2416152 A | 1/2006 |

*Primary Examiner* — Keith J Frisby
(74) *Attorney, Agent, or Firm* — Tarolli, Sundheim, Covell & Tummino LLP

(57) ABSTRACT

An airbag, in particular a front airbag, includes an outer wall having a front wall and a rear wall (18, 24) and a tether (16) as well as an electrically actuatable activation unit (26) for releasing the tether (16). The tether (16) includes plural tether portions (30, 32) connected to each other via a first tear seam (36). A tension means (40) is coupled to the tether (16) so that it destroys the first tear seam (36) when the activation unit (26) is actuated.

18 Claims, 4 Drawing Sheets

(56) References Cited

U.S. PATENT DOCUMENTS

Figure 1:
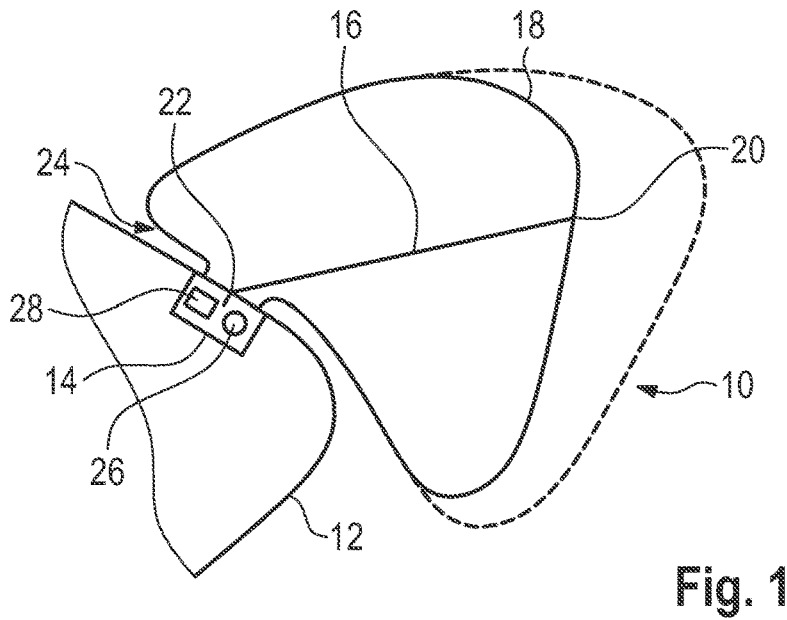

| | | |
|---|---|---|
| 11,685,333 B2 * | 6/2023 | Schmid ................ B60R 21/205 280/743.2 |
| 2007/0228710 A1 | 10/2007 | Ishiguro et al. |
| 2011/0031723 A1 | 2/2011 | Fischer et al. |
| 2012/0292897 A1 | 11/2012 | Puzzonia |
| 2016/0001733 A1 | 1/2016 | Kim et al. |
| 2016/0311392 A1 | 10/2016 | Jindal et al. |
| 2018/0215340 A1 | 8/2018 | Zhang et al. |
| 2020/0094770 A1 | 3/2020 | Fischer et al. |

\* cited by examiner

AIRBAG

RELATED APPLICATIONS

This application is a divisional of U.S. application Ser. No. 17/414,944, filed on Jun. 16, 2021, which is a U.S. National Stage under 35 USC 371 patent application, claiming priority to Application No. PCT/EP2019/086040, filed on 18 Dec. 2019; which claims priority from DE 10 2018 133 051.0, filed 20 Dec. 2018. These applications are hereby incorporated herein by reference in their entireties.

TECHNICAL FIELD

The invention relates to an airbag, in particular a front airbag, comprising an outer wall having a front wall and a rear wall, a tether provided inside the airbag and an electrically actuatable activation unit for releasing the tether so that the tether will no longer develop a restraining effect, the airbag adopting a large or a small inflation volume depending on the actuating state of the activation unit.

BACKGROUND

Those airbags are especially intended to provide an airbag volume adapted depending on the situation of restraint. Hence, the airbag can adopt two different geometries and two different volumes, depending on whether or not the tether exerts a restraining effect upon the front wall.

Moreover, there are recent efforts to specifically influence the inflation behavior and deployment behavior of the airbag during the deploying operation. This means that portions of the outer wall of the airbag are to be temporarily withheld during the deploying operation so as to promote deployment in different directions, and only afterwards the movement of the outer wall in the region restrained before will be released. This temporary restraint is obtained in particular by tear seams at tethers which will definitely tear in each case, i.e., during each inflating operation.

In future piloted driving, occupants are expected to be possibly reclined somewhat more in comfort positions than has been common, or the seat is expected to be displaced further rearward than has been previously common. Thus, even larger differences in volume between the various airbag configurations must be realized.

SUMMARY

It is the object of the invention to provide an airbag that is adapted to realize large differences in volume in the fully inflated state and which, in the actuated activation state, adopts the larger inflation volume. At the same time, the airbag is intended to be deployed in an optimized manner.

This object is achieved, in an airbag of the type mentioned at the outset, in that the tether is composed of plural tether portions coupled to each other via a first tear seam and a tension means which is coupled to the first tear seam at its front end portion (i.e. close to the front wall) is coupled to the activation unit so that, upon actuation of the activation unit, the tear seam is destroyed by tension, that is by the tension generated by this movement of the front wall, and, upon inflation and lacking actuation of the activation unit, the first tear seam remains intact and the airbag has the smaller inflation volume.

In the airbag according to the invention, the tether is not simply released by the activation unit or will remain fastened, when the activation unit is not activated, as was previously the case, but when the activation unit is actuated, also tearing of the first tear seam and, thus, temporary restraint of the front wall can be achieved in the course of the deployment operation. When the activation unit is actuated, the tether is destroyed and the airbag can adopt the larger geometry with the larger inflation volume.

Preferably, the tension means with the first tear seam is attached to the tether, i.e., the first tear seam connects at least three parts to each other, viz. the two tether portions and the tension means.

Well-directed tearing, on the one hand, and maintaining the stability of the first tear seam, on the other hand, is achieved by the tension means having a front end, with "front" always meaning closer to the front wall in a state of the airbag theoretically inflated such that no part is destroyed. From said front end, the tension means initially extends in the direction of the front wall to overlap the tether. In said overlapping area, the tension means with the first tear seam is fastened to the tether. After the tear seam, the tension means is folded over at an acute angle, with the folded part being no longer fastened by the first tear seam. Said folded portion extends in the direction of the activation unit. The technical effect resulting therefrom is as follows. If the tension means is not released but remains anchored at its rear end, it exerts a so-called "peeling force" upon the tear seam by the change of direction after the first tear seam. The tear seam is unstable for such an application of force and will tear, for said peeling force acts in such a way that it strives for separating the tension means from the front wall laterally to the pulling action. If the tension means is no longer held at the rear end, however, this effect of "peeling", i.e., of the movement of the tension means laterally away from the tether will no longer occur. Then the tear seam is only shear-loaded and is sufficiently stable to absorb the shear forces. The tether remains intact.

The first and second tether portions can extend exclusively side by side in the area where they are fastened to each other and can be subjected to tensile load in the opposite direction. This entails the fact that, between the tether portions in the area of the first tear seam, no effect of "peeling" will occur, but the first tear seam is only shear-loaded with respect to the force exerted upon the first tear seam by the tether portions.

The tension means may include a first part which is attached to the tether with the first tear seam in the area of its front end or merges integrally into a tether portion in the area of the first tear seam, wherein the tension means includes at least a second part which, in the area of a rear end of a first part, is optionally releasably fastened thereto. The term "optionally releasably" means that, depending on the actuation of the activation unit, the first part and the second part can be released from each other or remain fastened to each other. Thus, further optional releasing allows to achieve an additional temporary restraining effect which additionally temporarily controls the deployment.

In this context, the tension means may bifurcate at the rear end of the first part, namely into a second part and a third part extending side by side in the direction of the rear wall and the activation unit, wherein the second part is permanently arranged at the rear end and the third part is coupled by its rear end to the activation unit, i.e., is releasable in the area of its anchoring at the rear end. The second part remains anchored to the rear end, however, completely independently of the actuating situation of the activation unit. Said anchoring may be generally present in the area of the module or else of the rear wall. This embodiment enables the movement of the tether and additionally of the tension means to be further subdivided so that the tension means either will remain stable or will tear. The coupling of the three parts of the tension means is especially as follows. The first part and the second part extend in the area where they are fastened to each other exclusively side by side in a so-called overlapping area, when a tensile force is applied, i.e., during deployment and inflation of the airbag, and are subjected to tensile-load in the opposite direction. The third part extends from its front end toward the front wall and is fastened by a second tear seam to the first part and the second part. Hence, said second tear seam fastens all three parts of the tension means to each other. After the second tear seam, the third part is folded over at an acute angle, however, and extends in the direction of the activation unit. Here, as before, in connection with the tether the effect of "peeling" and, thus, the destruction of the second tear seam will occur, when the third part remains anchored and the activation unit is not actuated. When the activation unit is actuated, the second part will not introduce, because its anchoring is not released, any additional force into the second tear seam, and the latter remains intact. In this case, the first and second parts apply a pure shear force to the second tear seam due to the tensile forces acting in the opposite direction. This results in an additional positive effect for the airbag, for optionally one tear seam at a time can be activated, no matter whether or not the activation unit is actuated. Thus, for both states of release, the deployment movements can be influenced, as the front wall is temporarily restrained (until the tear seam is destroyed), and a deploying movement to the side or upwards or downwards is supported.

The airbag may comprise a front chamber and a rear chamber which can be fluidly coupled and uncoupled by a valve unit. The valve unit is coupled to the tether and is opened by the tether when the activation unit is actuated. Thus, the airbag may either have a small configuration when the valve unit is closed, or may have a large volume, when the valve unit is opened upon actuation of the activation unit. The front chamber then is either also inflated or not inflated.

Preferably, the front chamber rests on the rear chamber. In the non-inflated state of the front chamber, the front wall of the front chamber bears on the front wall of the rear chamber. The front chamber can be additionally fastened to the front wall in the non-inflated state via fixing tear seams. When the valve unit is opened upon actuation of the activation unit, said fixing tear seams will tear and the front chamber will be inflated/filled.

The rear chamber includes a closed front wall except for the valve unit in accordance with the preferred embodiment which, when the activation unit is not actuated, forms a supporting wall for the occupant and on which a wall bears that forms the front wall of the non-inflated front chamber. Said wall is fastened to the front wall of the rear chamber and forms a smaller airbag attached to the rear chamber which then forms the front chamber.

Two holding means juxtaposed and spaced apart from each other to which the tether is coupled can act on the front wall and in the interior of the airbag. The front wall is inverted at the holding means to form a smaller inflation volume, wherein, when the activation unit is actuated, the tether is released and the inversion is dropped.

The holding means can be connected to each other inside the airbag via a corset lacing coupled to the tether, when the activation unit is not actuated. A corset lacing is a cross lacing that alternates back and forth between the two holding means.

DRAWINGS

Figure 2:
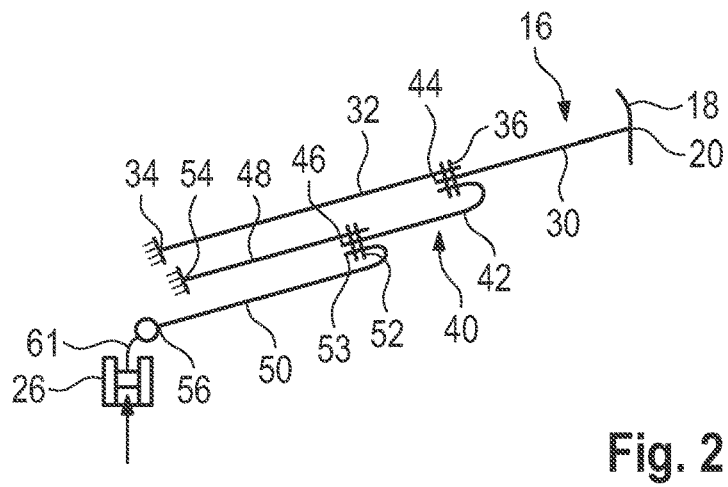
Figure 3:
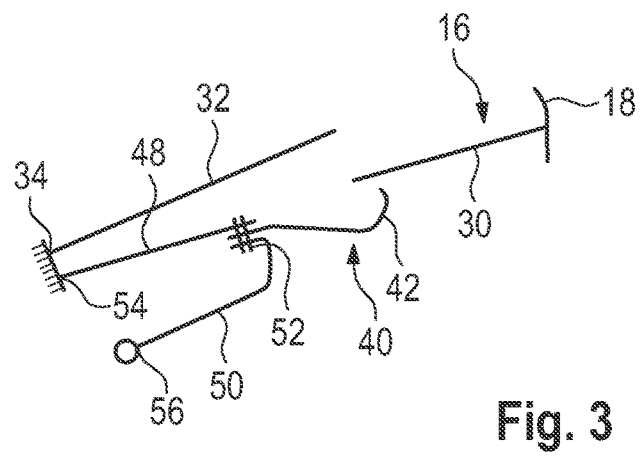
Figure 4:
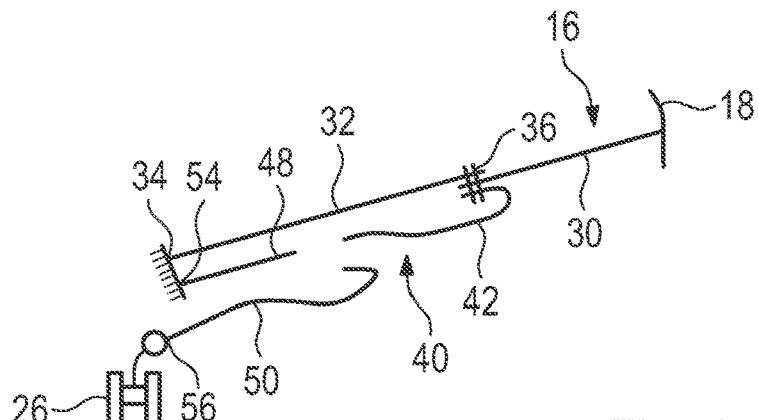
Figure 5:
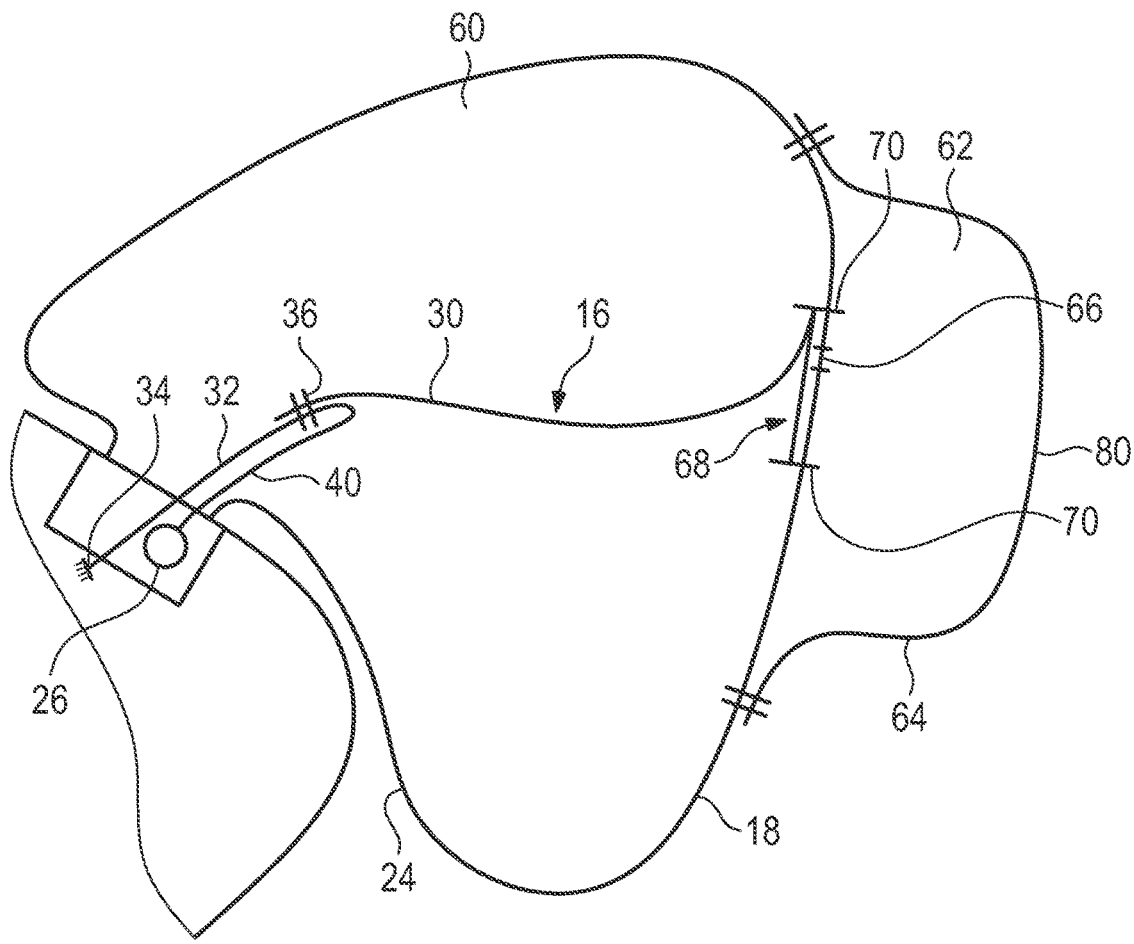
Figure 6:
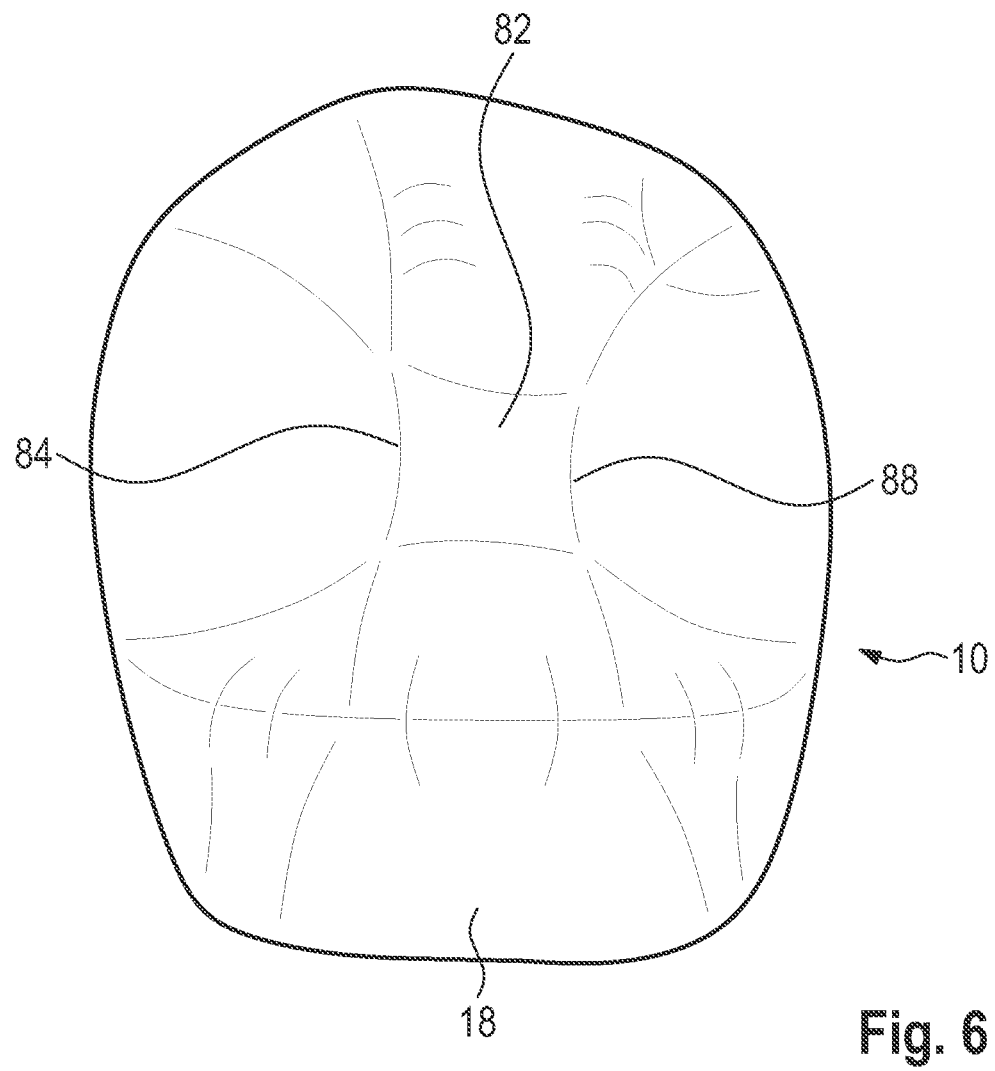
Figure 7:
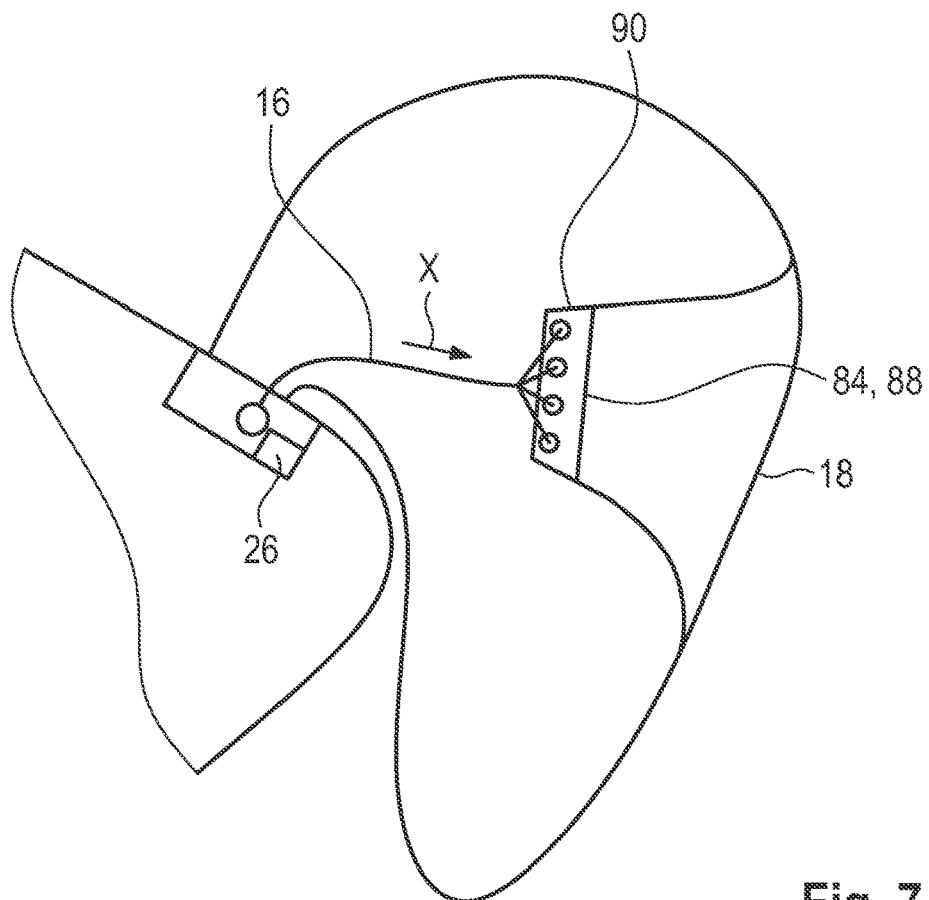
Figure 8:
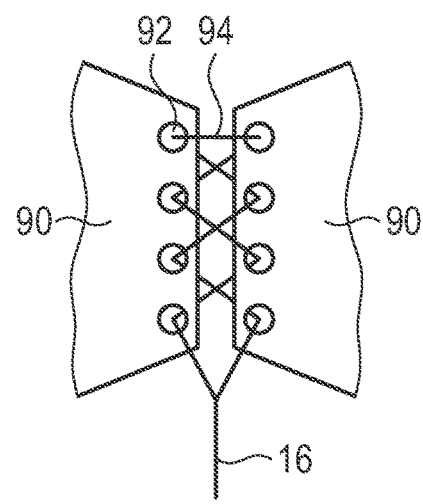

Further features and advantages of the invention will be obvious from the following description and from the following drawings which are referred to, and wherein:

FIG. 1 shows a side view of an embodiment of the airbag according to the invention having a small inflation volume and a large inflation volume, FIG. 2 shows a schematic view of the interior of the airbag according to a first variant comprising a tether and tension means in the starting situation, FIG. 3 shows a schematic view of the tether and the tension means with an actuated activation unit and a large airbag volume, FIG. 4 shows a schematic view of the tether and the tension means with a non-actuated activation unit and a small airbag volume, FIG. 5 shows a second embodiment in a schematic side view of the airbag according to the invention with a large airbag volume, FIG. 6 shows a front view of the airbag according to the invention in accordance with a third embodiment having a small airbag volume, FIG. 7 shows a sectional view in a lateral view across the airbag according to FIG. 6 when the activation unit is not actuated; and FIG. 8 shows a schematic view according to the arrow X in FIG. 7 showing a corset lacing.

DESCRIPTION

FIG. 1 illustrates a front airbag 10 that is accommodated in an instrument panel 12 of a vehicle and, moreover, is accommodated being folded in an airbag module 14. The airbag 10 deploys from the airbag module 14 in the case of an imminent or a currently occurring crash.

The airbag 10 may adopt two different configurations, i.e., it may have a small inflation volume (shown in continuous lines) and a large inflation volume (shown in broken lines). Thus, the airbag 10 may also adopt two different geometries.

In particular when an occupant is in a so-called comfort position, i.e., either has moved the vehicle seat very far backward and/or has strongly reclined the seatback, the large inflation volume is intended to be available, and in the other cases the small inflation volume is intended to be available.

The airbag 10 includes, in order to be capable of adopting the different configurations, in its interior one or more tethers 16 which are fastened, on the one hand, by their front end 20 to the front wall 18 and, on the other hand, are fastened by their rear end 22 either to the airbag module 14 or to the airbag wall, for example to the rear wall 24 in the area of the inflation orifice.

For controlling the two different states of the airbag 10, in the airbag module 14 an activation unit 26 such as a pyrotechnically working but electrically operable activation unit 26 is accommodated. The latter is either activated, viz. actuated or not depending on established parameters. In response thereto, the different inflation volumes are realized. The gas generator 28 for inflating the airbag 10 is especially a single-stage gas generator, but a multi-stage gas generator may be provided as well.

In FIG. 1, the tether 16 and the activation unit 26 are shown very schematically only, more details are obvious from the FIGS. 2 to 4.

In advance, it is emphasized, however, that the principle of all embodiments shown consists in obtaining the larger inflation volume when the activation unit 26 is actuated.

For the rest, the activation unit is realized, for example, such that it releases the rear anchoring of a tension means described hereinafter or destroys the tension means in the area of the rear anchoring so that the tension means is no longer retained.

FIG. 2 illustrates a variant showing the way in which the tether 16 can be released.

The tether 16 is made up of a first tether portion 30 that is fastened by the front wall 18 to the front end 20 and of a second tether portion 32. The second tether portion 32 is constantly anchored tightly, i.e., permanently by its rear end 34 in the area of the airbag module. The fastening can also be realized at the rear wall, such as at the inflation orifice, but also at the gas generator or other parts.

The tether portions 30, 32 are separate originally separated parts which are connected to each other via a first tear seam 36. For this purpose, the front end region of the tether portion 32 and the rear end region of the tether portion 30 are overlapping.

Here they form an overlapping region in which they extend exclusively side by side, i.e., when the tether 16 is subjected to tensile load, there is no deflection into any region of the tether portions 30, 32 or in the overlapping region. The tensile forces applied act in the opposite direction. With sufficient tensile load, the tether portions 30, 32 rather have a linear extension in a side view, as visible from FIG. 2, and said linear extension is also continued in the overlapping region.

A tension means 40 is fastened to the tether 16 by the tear seam 36, hereinafter referred to as first tear seam 36, wherein the tension means 40 may equally consist of plural parts, in the present embodiment of a first part 42 having a front end 44 which extends, from the front end 44, initially in parallel to the tether 16, i.e., also in parallel to the tether portions 30, 32, so as to then extend, after the tear seam 36, at an acute angle, in this case under 180° or almost 180°, toward the rear wall 24 or the module 14.

In the region of the rear end 46 of the first part 42, the tension means 40 bifurcates, viz. into a second part 48 and a third part 50, all of which are fastened to each other via a second tear seam 52. The formation of the tear seam 52 and the position of the individual parts corresponds to the orientation and the position of the corresponding parts at the first tear seam 36. This means that the second part 48 extends, with its front end region, above or below the rear end region of the first part 42 and overlaps the same, wherein there is no change of direction in this case and both parts 42, 48 extend linearly in a side view, when they are subjected to tensile load.

However, the third part 50 extends starting from its front end 53 initially in parallel and overlapping to the overlapping first and second parts 42, 48, but then, viz. after the second tear seam 52 and the corresponding overlapping region of the parts 42, 48, 50 at an acute angle backwards in the direction of the activation unit 26.

The rear end 54 of the second part 48 is permanently fastened, e.g., on the airbag or another part of the module such as on the gas generator. The rear end 56 of the third part 50 is coupled to the activation unit 26, however, and can be released when the activation unit 26 is actuated. Purely symbolically, this is illustrated so that the rear end 56 is received in a displaceable holder 61 which can be released after being displaced (see arrow).

FIG. 2 illustrates the state in which the tether 16 and the tension means 40 are equally substantially tensioned, wherein neither the tether 16 nor the tension means 40 is provided in the activated state of the gas generator 28. In this "slightly" inflated state, the portions and parts were explained before. Only in the FIGS. 3 and 4 are states shown which are provided after activation of the gas generator.

In the embodiment according to FIG. 3, the gas generator is ignited, and the activation unit 26 is actuated. This means that the rear end 56 of the third part 50 is released, whereas both the rear end 54 of the second part 50 and the rear end 34 of the tether 16 remain anchored, because they are fastened either to the airbag or to any other part of the airbag module.

When the activation unit 26 is actuated, the second tear seam 52 remains stable, and tension is applied to the first tear seam 36 via the tension means 40 by the first part 42 and the second part 50 remaining fastened to each other when the front wall 18 is moved forward in the direction of the occupant. The length of said tension means 40 is configured so that it is shorter than the distance between the rear end 34 and the tear seam 36 or, in other words, the tension means 40 is tightened, before the portion of the tether 16 between the rear end 34 and the first tear seam 36 is tightened.

By deflecting the first part 42 at an acute angle, a force generated by a so-called peeling effect is applied to the tear seam 36. Due to the deflection, the first part 42 aims at laterally detaching from the overlapping region of the first tether portion 30 and the second tether portion 32. In this direction of force, the first tear seam 36 is unstable and breaks so that not only the tension means 40 detaches from the tether 16, but also the tether 16 is separated into its two components. This means the tether 16 is destroyed and no longer active, and the two tether portions 30, 32 are no longer fastened to each other, as shown in FIG. 3.

In this way, the larger airbag volume can be reached. During the deployment operation, the airbag 10 was restrained for a short time, however, namely when initially the tension upon the tension means 40 is triggered, namely until the destruction of the second tear seam 36 is reached. Thus, the front wall 18 is temporarily prevented from deploying and the inflowing gas deploys other portions of the airbag.

FIG. 4 illustrates the situation when the activation unit 26 is not actuated and, thus, the smaller airbag volume is to be realized. Then, the rear end 56 remains anchored. For the same reason, viz. the peeling effect, in this case the second tear seam 52 is destroyed so that the first part 42 detaches both from the second part 48 and from the third part 50. The tension means 40 is destroyed and exerts no force upon the first tear seam 36. This means that there will be no more peeling effect. The first tear seam 36 is only shear-loaded, and such load will not result in the destruction of the tear seam 36.

Thus, the tether 16 remains intact and can prevent the front wall 18 from moving further in the direction of the occupant.

In the variant according to FIG. 5, the airbag 10 has a rear chamber 60 and a front chamber 62 resting on the rear chamber 60, the front chamber 62 being closer to the occupant and being formed by an airbag wall 64 which is stitched onto the front wall 18 of the rear chamber 60. The front wall 18 also delimits the front chamber 62 especially at its rear end.

The front wall 18 includes one or more overflow openings 66 via which a fluid communication can be established between the chambers 60, 62.

A valve unit 68 closes the one or more overflow openings 66 in the initial state, however. The valve unit 68 can be a fabric portion, for example, or any other flexible flat component which is located inside the first chamber 60 and is connected to the front wall 18 via tear seams 70, for example.

The valve unit 68 is actuated by the tether 16 and can be transferred from the originally closed state to an opened state. In this case, too, the tether 16 has a first portion 30 leading to a first tear seam 36, where the first tether portion 30 is connected to a second tether portion 32. The rear end 34 of the tether 16 is permanently fastened in this case again on the module or the airbag.

In contrast to the embodiment according to FIGS. 2 to 4, here the second tether portion 32 and the tension means 40 integrally merge into each other. This means that the respective part first extends from the rear end 34 to the first tear seam 36 and after the first tear seam 36 extends at an acute angle back toward the module, where the other end is coupled to the activation unit 26. This variant can also be realized, of course, in the embodiment according to FIGS. 2 to 4.

When the activation unit 26 is actuated, the rear end of the tension means 40 is no longer fixed so that no force can be exerted via the tension means 40 upon the first tear seam 36 and the latter remains stable. This means in turn, however, that the valve unit is opened, for when the front wall 18 is moved forward, the tether 16 is subjected to tensile load and breaks up the valve unit 68 by undoing the tear seams 70.

The overflow opening 66 is free so that gas can flow via the rear chamber 60 into the front chamber 62, and both chambers 60, 62 are inflated. The airbag 10 has the larger volume.

However, when the activation unit 26 is not actuated, the tension means 40 exerts, when being tightened, a force upon the first tear seam 36 and results in destruction thereof. Then the tether 16 is equally destroyed and no force is exerted upon the valve unit 68, the overflow opening 66 remains closed, and the second chamber 62 is not inflated. The so-called support wall 80, i.e., the front wall of the second chamber 62, bears on the front wall 18.

FIG. 6 illustrates the front wall 18 of another airbag 10 in the state of a small inflation volume. It is evident that in a central region 82 the front wall 18 is drawn in. The central region 82 is laterally delimited by two linear regions 84 and 88 which extend substantially in parallel to each other and are laterally spaced apart from each other. FIG. 7 illustrates a schematic section across the airbag 10. The regions 84, 88 are formed by the fact that two holding means 90 juxtaposed and spaced apart from each other act on the front wall 18 and result in the front wall 18 being inverted as is shown in somewhat exaggerated form in the section of FIG. 7. The holding means 90 may be dart-shaped regions of the front wall 18 or may be stitched-on strips, for example. The opposite holding means 90 include holes 92 or corresponding eyes which are shown in FIG. 8 and which are interconnected by a so-called corset lacing 94.

The corset lacing is defined by a lacing extending in cross shape.

The tether 16 acts on the corset lacing. FIG. 7 shows no more details about how the tether 16 can be destroyed or can remain active. In this respect, the preceding Figures can be referred to all of which illustrate options of designing such mechanism.

When the tether 16 is not destroyed, the corset lacing 94 is not loosened, either, and the airbag retains the smaller configuration shown in FIG. 7. If, however, the tether 16 is destroyed, because the activation unit 26 is actuated, the corset lacing 94 can come loose, and there is available more area of the front wall 18 which can bulge outward so that the airbag can adopt the larger airbag volume.

The invention claimed is:

1. An airbag system comprising:
    an airbag comprising a front wall and a rear wall, the airbag being configured to be inflated to a large inflated volume or a small inflated volume;
    a tear seam that controls whether the airbag is inflated to the large inflated volume or the small inflated volume;
    a tether provided inside the airbag, the tether comprising plural tether portions including a tension portion;
    an electrically actuatable activation unit connected to the tension portion of the tether and being configured to release the tension portion when actuated,
    wherein the airbag, tear seam, tether, and actuation unit are configured so that the actuation unit when actuated releases the tension portion, which causes the tear seam to be released so that the airbag inflates to the large inflated volume, and so that the actuation unit when not actuated maintains its connection to the tension portion, which causes the tear seam to be maintained so that the airbag inflates to the small inflated volume.

2. The airbag system according to claim 1, wherein the plural tether portions further comprises first and second tether portions, the second tether portion extending forward from a permanently fastened rear end toward the front wall of the airbag, a portion of the second tether portion overlapping a portion of the first tether portion, the overlapping portions of the first and second tether portions being interconnected with each other, wherein the tension portion integrally merges into the second tether portion adjacent the interconnection of the overlapping portions and is folded over at an acute angle so as to extend in the direction of the activation unit.

3. The airbag system according to claim 2, wherein the tension portion extends in the direction of the activation unit toward the rear wall of the airbag.

4. The airbag system according to claim 2, wherein the overlapping portions are interconnected by a tear seam.

5. The airbag system according to claim 4, wherein the tear seam interconnecting the overlapping interconnected portions of the first and second tether portions is configured to be maintained when the activation unit is actuated and to rupture when the activation unit is not activated.

6. The airbag system according to claim 5, wherein the tension portion is configured to become tensioned in response to the activation unit not being activated, wherein tension on the tension portion is configured to rupture the tear seam interconnecting the overlapping interconnected portions of the first and second tether portions.

7. The airbag system according to claim 5, wherein:
    the tear seam that controls whether the airbag is inflated to the large inflated volume or the small inflated volume is configured to rupture in response to the tear seam interconnecting the overlapping interconnected portions of the first and second tether portions being maintained; and
    the tear seam that controls whether the airbag is inflated to the large inflated volume or the small inflated volume is configured to be maintained in response to the tear seam interconnecting the overlapping interconnected portions of the first and second tether portions being ruptured.

8. The airbag system according to claim 2, wherein the overlapping interconnected portions of the first and second tether portions extend exclusively side by side and are configured so that they are subjected to tensile load in opposite directions.

9. The airbag system according to claim 2, wherein the tether has a bifurcated configuration in which the first tether portion is connected at the front wall of the airbag and extends toward the rear wall of the airbag to the interconnected overlapping portions where the tether bifurcates to the second portion, which extends to the permanently fastened rear end, and the tension portion, which extends at the acute angle to the activation unit.

10. The airbag system according to claim 9, wherein the first and second tether portions are configured to extend linearly between the front and rear walls of the airbag.

11. The airbag system according to claim 1, wherein the airbag comprises front and rear chambers which can be fluidly coupled to and uncoupled from each other by a valve unit, wherein the valve unit is coupled to the tether and is opened by the tether when the activation unit is actuated.

12. The airbag system according to claim 11, wherein the valve unit is coupled to the first tether, and wherein the tear seam that controls whether the airbag is inflated to the large inflated volume or the small inflated volume forms a connection of the valve unit to a front wall of the rear chamber.

13. The airbag system according to claim 12, wherein tension on the tether is configured to cause rupture of the connection of the valve unit to the front wall of the rear chamber, which allows inflation gas to enter the front chamber from the rear chamber.

14. The airbag system according to claim 11, wherein the front chamber is supported on the rear chamber.

15. The airbag system according to claim 11, wherein the airbag is configured so that the rear chamber is inflated and the front chamber is deflated when the airbag is inflated to the small inflated volume, and so that both the rear chamber and front chamber are inflated when the airbag is inflated to the large inflated volume.

16. The airbag system according to claim 11, wherein the front wall of the airbag comprises a front wall of the rear chamber and a support wall that overlies the front wall of the rear chamber, wherein the support wall rests upon the front wall of the rear chamber when the airbag is inflated to the small inflated volume.

17. The airbag system according to claim 16, wherein the support wall and the front wall of the rear chamber define the front chamber.

18. The airbag system according to claim 1, wherein the airbag comprises a front airbag.

\* \* \* \* \*